(12) United States Patent
Uhlendorf et al.

(10) Patent No.: US 12,007,581 B2
(45) Date of Patent: *Jun. 11, 2024

(54) ULTRA-COMPACT, HIGHLY STABLE PROJECTOR MODULES

(71) Applicant: Jabil Optics Germany GmbH, Jena (DE)

(72) Inventors: Kristina Uhlendorf, Jena (DE); Theresa Kunz, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 402 days.

This patent is subject to a terminal disclaimer.

(21) Appl. No.: 17/462,878

(22) Filed: Aug. 31, 2021

(65) Prior Publication Data

US 2021/0397013 A1 Dec. 23, 2021

Related U.S. Application Data

(63) Continuation of application No. 16/280,729, filed on Feb. 20, 2019, now Pat. No. 11,137,618.

(30) Foreign Application Priority Data

Feb. 23, 2018 (DE) ...................... 10 2018 104 198.5

(51) Int. Cl.
*G02B 27/42* (2006.01)
*G02B 13/00* (2006.01)
(Continued)

(52) U.S. Cl.
CPC ......... *G02B 27/425* (2013.01); *G02B 13/007* (2013.01); *G02B 19/0052* (2013.01); *G02B 27/0944* (2013.01); *G02B 27/30* (2013.01)

(58) Field of Classification Search
CPC ................ G02B 27/425; G02B 13/007; G02B 19/0052; G02B 27/0944; G02B 27/30;
(Continued)

(56) References Cited

U.S. PATENT DOCUMENTS 11,137,618 B2 * 10/2021 Uhlendorf ............ G02B 13/007
2011/0187878 A1 * 8/2011 Mor ........................ G03B 15/06
348/E5.024

(Continued)

FOREIGN PATENT DOCUMENTS

DE              10057791 A1 *  5/2002  ............. G02B 27/30
DE       10 2005 037 435 A1    2/2007
(Continued)

*Primary Examiner* — Magda Cruz
(74) *Attorney, Agent, or Firm* — Young Basile Hanlon & MacFarlane, P.C.

(57) ABSTRACT

The invention relates to a projector module. In particular, the invention relates to a projector module for the use in mobile devices, wherein a most compact, stable and reliable module structure with high module efficiency can be achieved. A projector module according to the invention comprises a beam path with a laser source, designed to emit coherent electromagnetic radiation with a divergent beam profile; a collection optics, designed to collimate or focus the divergent radiation emitted by the laser source convergently into an image plane; and a diffractive optical element, DOE, designed to generate a projection pattern from the radiation collimated or focused by the collection optics; wherein a deflector, designed to deflect the divergent radiation emitted by the laser source from a first direction into a second direction deviating from the first direction, is arranged in front of the collection optics or is designed as a collection optics.

18 Claims, 7 Drawing Sheets

(51) Int. Cl.
    *G02B 19/00*        (2006.01)
    *G02B 27/09*        (2006.01)
    *G02B 27/30*        (2006.01)

(58) Field of Classification Search
    CPC ........ G02B 2027/0174; G02B 17/0673; G02B 17/0868; G02B 19/0028; G02B 27/18; G02B 27/4233; G02B 17/06
    See application file for complete search history.

(56) References Cited

U.S. PATENT DOCUMENTS

| | | |
|---|---|---|
| 2012/0038986 A1 | 2/2012 | Pesach |
| 2014/0078514 A1 | 3/2014 | Zhu |
| 2017/0176757 A1* | 6/2017 | Havlik ............... G02B 27/0983 |
| 2017/0269269 A1 | 9/2017 | Nagashima et al. |
| 2017/0351110 A1 | 12/2017 | Gurgov |
| 2018/0239096 A1* | 8/2018 | Houbertz ............. G02B 6/4214 |
| 2020/0318805 A1 | 10/2020 | Kurashige et al. |

FOREIGN PATENT DOCUMENTS

| | | |
|---|---|---|
| DE | 10 2005 039 519 A1 | 2/2007 |
| EP | 3 112 923 A1 | 1/2017 |
| WO | 2010/036972 A1 | 4/2010 |
| WO | 2013190323 A1 | 12/2013 |
| WO | 2017/069954 A1 | 4/2017 |

\* cited by examiner

Prior Art

ULTRA-COMPACT, HIGHLY STABLE PROJECTOR MODULES

CROSS-REFERENCE TO RELATED APPLICATION(S)

This application is a continuation application of U.S. patent application Ser. No. 16/280,729 filed Feb. 20, 2019, which claims priority to and the benefit of German Patent Application No. 10 2018 104 198.5, filed Feb. 23, 2018, the entire disclosures of which are hereby incorporated by reference.

TECHNICAL FIELD

The invention relates to a projector module. In particular, the invention relates to a projector module for the use in mobile devices, wherein a most compact, stable and reliable module structure with high module efficiency can be achieved.

BACKGROUND

Especially in mobile devices such as smartphones, laptops, tablets, virtual reality, mixed reality or augmented reality glasses, the available installation space is decreasing due to new functions being added time and again. Therefore, the requirements for the compactness of the assemblies (modules) used in them are constantly increasing. In addition to electronic assemblies, also optical and opto-electrical modules are increasingly being integrated into the devices. In such modules, different individual elements (e.g. lenses, mirrors, light or laser sources or detectors) are mostly combined with each other and integrated in a housing at a fixed distance from each other.

In the case of mobile devices, in addition to the compactness mentioned above, a particularly high level of stability and reliability of each individual module is also important. Further requirements lie in the efficiency of such modules. For example, in addition to using energy-saving emitters, it is also necessary to ensure maximum loss-free light transmission and to avoid scattering in inside of the modules (high module efficiency).

Projector modules can be used to generate an optical pattern for 3D environment or gesture recognition applications. These projector modules emit a given reference pattern into the environment of the mobile device, which is distorted at the surface by objects in the environment. The thereby resulting distortion pattern can then be recorded and evaluated by a corresponding camera module. From the distortions of the known reference pattern, distances to the individual objects and thus the 3D information can be determined. The reference pattern can, for example, be a point or line pattern.

Projectors for pattern generation are known for example from EP 3 112 923 A1 or WO2017/069954 A1. However, the projector modules used so far cannot be reduced to the desired size and take up far too much installation space. One solution for this is to break through the outer frame of the devices holding the module and thus allow the module to protrude or to limit the functionality of the module, e.g. by illuminating a smaller field of view or by reducing the resolution of the projected pattern. Such limitations, however, make 3D recognition so bad that it does not meet the requirements of the market and the desired application areas. Especially disadvantageous are usually a too low resolution and a low contrast.

In particular, a collimator for laser diodes and a projector for pattern generation with such a collimator are known from US 2017/0351110 A1. The collimator comprises three optical surfaces; a first refractive surface, a second reflective surface and a third refractive surface. Within the collimator, it comes to a change of the beam direction.

One possibility for the generation of projection patterns is the use of a correspondingly designed diffractive optical element (DOE). DOEs are generally known and can generate almost any kind of diffraction pattern from a coherent input radiation. Usually, the divergent output radiation of a laser source (e.g. laser diode) is first collimated by a lens (converging lens) or focused convergently into a certain image plane and subsequently this collimated or convergent radiation is supplied to the DOE for beam transformation (see FIG. 1). While the DOE can in principle be joined directly to the converging lens, the aperture angle of the laser beam emitted from the laser source and the desired beam diameter in front of the DOE require a certain minimum distance between the beam exit at the laser source and the converging lens. This minimum distance, which is due to the radiation cannot be undercut and is until now an obstacle to further miniaturization of corresponding projector modules.

SUMMARY

Consequently, it is the object of this invention to avoid or at least significantly reduce the problems arising in the state of the art in the miniaturization of optical projector modules. In particular, a projector module for use in mobile devices shall be provided, which enables a most compact, stable and reliable module structure with high module efficiency. However, there shall be no limitation of the optical functionality of existing solutions.

According to the invention, said objects are solved by the features of patent claim 1. Suitable embodiments of the invention are included in the subclaims.

A projector module according to the invention comprises a beam path with a laser source designed to emit coherent electromagnetic radiation with a divergent beam profile; a collection optics designed to collimate or focus convergently into a specific image plane the divergent radiation emitted by the laser source; and a diffractive optical element, DOE, designed to generate a projection pattern from the radiation collimated or converged by the collection optics; wherein a deflector, designed to deflect the divergent radiation emitted by the laser source from a first direction into a second direction deviating from the first direction, is arranged in front of the collection optics or is designed as a collection optics. Preferably, the first and second directions enclose an angle of 90°, more preferably an angle of 90° to 80°.

The laser source can preferably be a VCSEL, an edge emitter, or a FP, DFB or DBR laser diode. The wavelength of the emitted radiation can preferably be in the visible (VIS) or infrared (IR, NIR, FIR) spectral range. Typically, the laser source has an elliptical divergence profile. The two half-axes of the ellipse are usually called fast axis (maximum divergence angle) and slow axis (minimum divergence angle) due to their divergence.

Coherent radiation is particularly referred to as electromagnetic waves with a stable phase relationship with regard to their spatial and/or temporal propagation properties. A radiation emitted by a laser source is generally to be regarded as coherent. The coherence of the radiation must be suitable for generating a projection pattern at the DOE. Preferably, the radiation emitted by the laser source is monochromatic or quasi-monochromatic.

A collection optics is understood to be an individual optical component or assembly which "collects" the radiation emitted by the laser source and, according to the invention, transfers it into a collimated (i.e. parallel or quasi-parallel along the propagation direction) or convergent (i.e. converging along the propagation direction) radiation field (collimation or focusing of the "collected" radiation). Lenses are preferably used as collection optics, wherein the collection optics is generally arranged in such a way that the radiation exit at the laser source coincides or almost coincides with the focal point of the collection optics. The focal length of the collection optics in the direction of the laser source is preferably in the range between 1 mm and 6 mm for the applications described, depending on the desired resolution of the projection pattern and the distance range. Short focal lengths are particularly suitable for close projection distances and long focal lengths are particularly suitable for distant projection distances. The collection optics is preferably a rotationally symmetrical spherical or aspherical lens.

The collection optics is preferably made of a glass material, since there is less change of the refractive index with the temperature in these materials compared to conventional plastic materials. This reduces temperature-dependent defocusing of the projected diffraction pattern. For a maximum reduction of the installation space required for the collection optics, the collection optics can also comprise a Fresnel lens due to its flat design. Such lenses can be composed of a glass material or plastic. Although plastic lenses are more sensitive to temperature changes, they can be advantageous due to their simple and inexpensive manufacturing and lower weight.

Diffractive optical elements (DOEs) can be used in many ways and can be adapted to a wide range of applications by means of a corresponding design. These elements can preferably comprise a glass material as substrate or volume carrier. With regard to temperature dependency and manufacturing, the statements already made on collection optics apply correspondingly in comparison to plastic-based DOEs. Therefore, a DOE depending on the requirement profile may comprise a plastic material despite its possibly worse optical properties.

The idea of the present invention consists in the fact that a projector module according to the state of the art for an extremely small design is adapted to fold the beam path via (at least) one additional deflecting device, which is designed to deflect the divergent radiation emitted by the laser source from the first into a second direction and which is arranged in front of the collection optics or designed as a collection optics, in such a way that the projector module can be reduced in its overall length and overall width using optical laws without the module losing its functionality. The specific resolution, the distance range achieved, the contrast and other properties can thus be maintained. In particular, the idea of the present invention is based on inserting a beam convolution around one or more axes into the minimum radiation distance of the divergent radiation field caused by the aperture angle of the laser radiation emitted from the laser diode and the desired beam diameter in front of the DOE, wherein the required installation space can be further reduced without having to adapt the required minimum distance.

Preferably in a projector module according to the invention, the laser source, the collection optics, the DOE and the deflector are arranged in a common housing body, wherein the housing body is a hollow body made of a body material, the inner region of which is designed for the conclusive reception of said components and in which non-radiation-guiding regions of the beam path are enclosed by the body material. In other words, regions within the hollow body, which do not serve for holding and accommodating the individual components or do not serve as a beam guiding region, are therefore filled by the body material. Preferably, the common housing body is formed from a plastic material.

Such an arrangement of the components in the housing body has the advantage that the individual components are connected stably and reliably to the housing body and the occurrence of scattered light is effectively avoided. The inner regions adapted to the beam guidance result on the one hand in the beam angle of the projector module being limited to the design aperture angle of the projector module. On the other hand, any scattering elements that may occur on the individual component surfaces are effectively suppressed in their propagation. It is therefore particularly advantageous if the inner surfaces of the hollow body are absorbent to the radiation emitted by the laser diode. This can be realized, for example, by a corresponding choice of the body material or by a blackening of said surfaces. These measures can therefore improve both the stability and reliability of the module as well as its functionality, especially for applications sensitive to scattered light.

Preferably, the housing body has external dimensions with lengths, widths and heights (L×W×H) between 2 mm and 6 mm each. Preferably, the housing body has external dimensions approximately in the form of an equilateral parallelepiped. A preferred dimension for a disc-shaped square DOE is a side length between 1 mm and 5 mm and a height between 0.5 mm and 1.5 mm. For example, the collection optics may be a rotationally symmetric lens with a diameter between 1 mm and 5 mm. According to these specifications, a preferred diameter of the collimated radiation is between approximately 1 mm and 4 mm. In this case, it is usually assumed that the distance between the radiation exit at the laser source and the deflection at the deflector is approximately in the range between 1 mm and 5 mm (length of the divergent range). In the state of the art, however, the overall length of the laser source must also be considered for linear arrangement of the components.

Typically, the laser source has an elliptical divergence profile, wherein the deflector is arranged in such a way that a deflection preferably takes place around the slow axis of the divergence profile. This can in particular lead to a reduction in the overall width of the module. However, such an arrangement is more complex than an arrangement of the deflector for deflection around the fast axis. A deflection around the fast axis is therefore preferred due to simpler production. A deflection around an axis is generally referred to as a radiation deflection in which there is no spatial rotation of the corresponding axis during the deflection, i.e. in which a deflection takes place simultaneously for all phase points along the axis.

The spot size of the divergent radiation on the deflector is smaller than 50% of the beam diameter directly in front of the collection optics. A spot size ratio of less than 40% is more preferred, less than 30% is more preferred, less than 25% is more preferred and less than 20% is even more preferred. If the spot size ratio is greater than 50%, there is a risk that even though the length of the module can be reduced, the overall width of the module may increase due to the overall length of the laser source. As an alternative to the definition mentioned above, the distance between radiation exit at the laser source and deflection at the deflector can also be put into relation with the distance between deflection at the deflector and the input side of the collection optics. In this case, a value of less than 1:2 is preferred analogously. The spot size is preferably considered to be the surface area of the radiation field at the corresponding location, wherein a determination takes place with the aid of the beam radius along arbitrary axes of the spot in each case at the locations at which the intensity of the radiation field has fallen to 1/e2 (approx. 13.5%) of the maximum value in the spot (Gauss radius).

In the case of a first embodiment of the invention, the deflector is a planar mirror, wherein the mirror is arranged between the laser source and the collection optics. Such a solution can be easily and cost-effectively integrated into existing designs and already enables a considerable reduction of the overall length of the projector module ("single folding"). The mirror is preferably arranged in such a way that the total overall length of the combination of laser module and mirror is smaller than the width of the collection optics along the beam input side.

In the case of a second embodiment of the invention, the deflector is an aspherically, preferably parabolically, curved mirror. Preferably, the deflector in this embodiment can be designed as a collection optics, i.e. the curvature of the mirror is designed to transform a divergent input radiation, which propagates along a first direction and hits the mirror, by reflection into a collimated or convergent output radiation, which subsequently propagates along a second direction deviating from the first direction ("collection mirror"). Hereby, installation space is saved by combining optical elements.

In a third embodiment of the invention, at least two deflectors deflect the divergent radiation emitted by the laser source before it hits the collection optics. Such an arrangement has the advantage that a deflection can take place along different radiation axes ("multiple folding"). In particular, when using a laser source with an elliptical divergence profile, a deflector can preferably be arranged in such a way that a deflection takes place around the fast axis and the slow axis of the divergence profile. If the beam path is folded along both directions, it is also possible to further reduce the width of the configuration described as the second embodiment of the invention. Main deflection and collimation or focusing remain to take place by means of the curved collection mirror ("collection mirror with multiple folding").

In a fourth embodiment of the invention, the collection optics are a prism lens with a free-form surface on the exit side, i.e. on the side on which the collimated or convergent radiation exits, and an opposite plane surface, wherein the plane surface is inclined with respect to the optical axis of the radiation collimated or converged by the collection optics (20) ("lens prism"). Such an arrangement has the advantage that, in combination with a deflector in the form of a planar mirror, the divergent parts of the beam path can undergo a tilting with respect to the optical axis of a DOE arranged directly downstream of the collection optics, whereby the spatial position of a combination of laser module and mirror can be more freely determined in correspondence with a first embodiment of the invention. In this way, the overall width of the module can also be reduced. In particular, the collection optics and a deflector are combined. In particular, by using a correspondingly designed lens prism, the divergent part of the beam path can fall obliquely into the lens prism without generating distortions in the beam course. Preferably, a lens prism pressed from glass materials is used to ensure sufficient temperature stability. Preferably, the free-form surface is designed asymmetrically and shifted with respect to the center of the lens prism.

In a fifth embodiment of the invention, the deflector comprises at least two prism elements, wherein the prism elements are arranged to form a prism body ("prism folding"). The term prism body thereby means that the transitions of the radiation between the prisms take place without an intermediate air gap, i.e. the prism body has only one entrance and one exit surface for the radiation. Preferably, the prism body can have a lens surface (e.g. spherical, aspherical or as a free-form) at its entrance surface for a reduction of the radiation divergence in the inside of the prism body.

Such an arrangement has the advantage that a part of the divergent radiation field can be deflected in a very compact way in the inside of the prism body. A high refractive index of the prism material, optionally in combination with a lens surface on the entrance side, leads to a decrease of the divergence in the inside of the prism body, whereby a multiple folding in the narrowest space is possible. Furthermore, the optical effect of the collection optics can be reduced, i.e. a lens with a longer focal length can be used. Due to the lower refractive power, temperature changes no longer have such a strong effect, so that the lens can comprise a plastic or be made of it. A corresponding prism body can also be made of plastic. Therefore, a corresponding projection module not only shows an extremely small overall dimension and excellent optical properties but also a low weight, a simple manufacturability as well as low manufacturing costs as advantages.

Another aspect of the present invention relates to a mobile device (e.g. smartphone, laptop, tablet, virtual reality, mixed reality or augmented reality glasses) which comprises a projector module corresponding to the previous description. Due to the reduced installation space which has been reduced to a technical minimum according to the invention, the projector module can also be integrated into such devices without breaking through the outer frame of the device.

Another aspect of the present invention relates to the use of a projector module corresponding to the previous description for generating a projection pattern for three-dimensional environmental or pattern recognition in mobile devices.

BRIEF DESCRIPTION OF THE DRAWINGS

The invention is explained hereinafter in exemplary embodiments on the basis of the corresponding drawing. Shown as.

DETAILED DESCRIPTION

Figure 1:
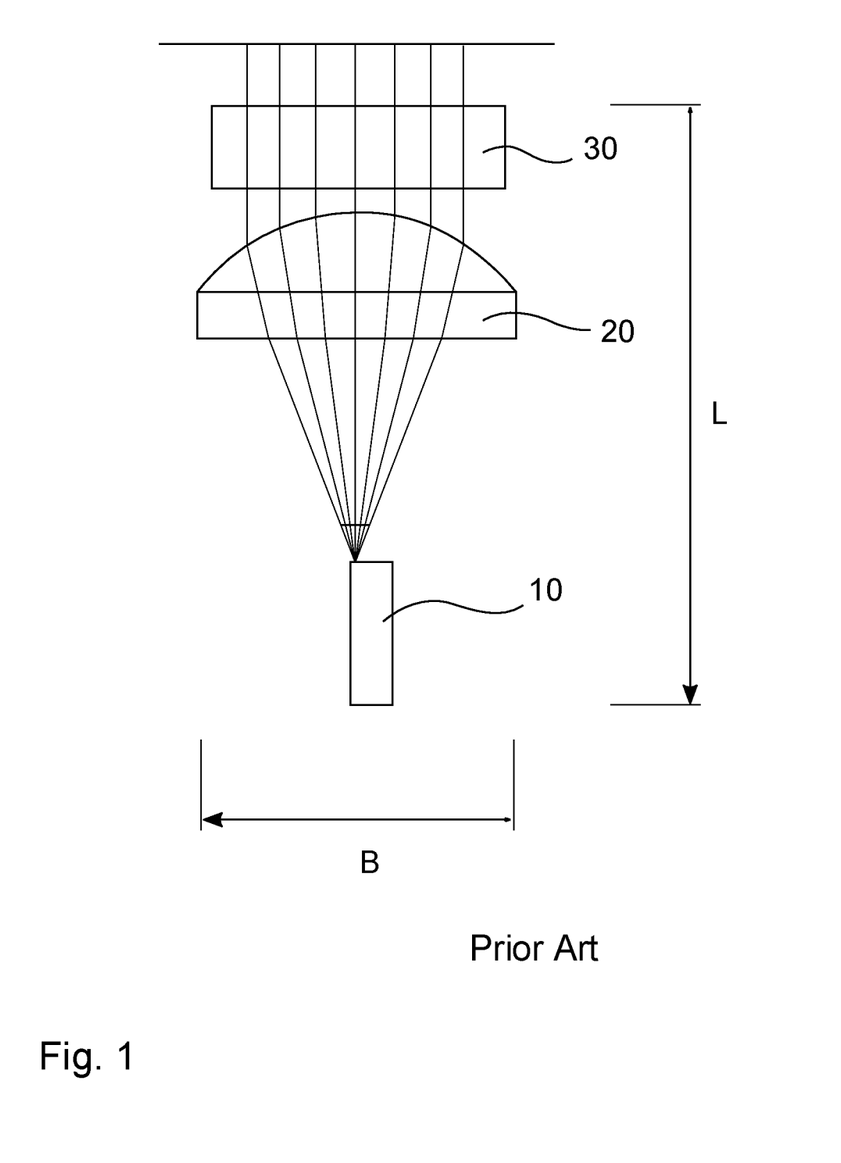
FIG. 1 is a schematic structure of a conventional projector module according to the state of the art.

FIG. 1 shows a schematic structure of a conventional projector module according to the state of the art. The projector module comprises a beam path with a laser source 10, a collection optics 20 in the form of a lens, and a diffractive optical element, DOE 30, for generating a projection pattern. These elements are aligned along a common longitudinal axis (corresponding to the optical axis of the system), wherein an overall length L results along this axis. An electromagnetic radiation emitted by the laser source 10 therefore retains its direction of propagation. The overall width B of the arrangement results as the width of the widest component. Here, this is the width of the collection optics 20.

Figure 2:
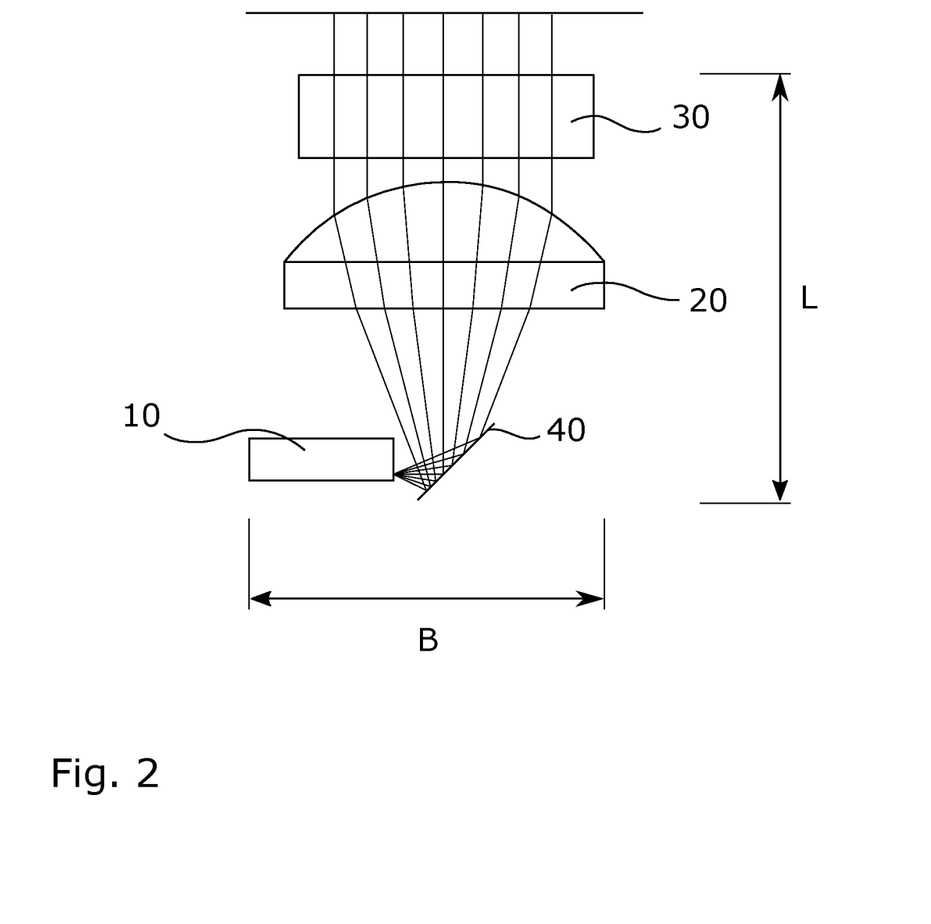
FIG. 2 is a schematic structure of a first embodiment of a projector module according to the invention ("single folding")

FIG. 2 shows a schematic structure of a first embodiment of a projector module according to the invention ("single folding"). The projector module comprises a beam path with a laser source 10, designed to emit coherent electromagnetic radiation with a divergent beam profile; a collection optics 20, designed to collimate or focus convergently into an image plane the divergent radiation emitted by the laser source 10; and a diffractive optical element, DOE 30, designed to generate a projection pattern from the radiation collimated or converged by the optical collection optics 20; wherein a deflector 40, designed to deflect the divergent radiation emitted by the laser source 10 from a first direction into a second direction deviating from the first direction, is arranged in front of the optical collection optics 20. The deflector 40 shown is a planar mirror, wherein the mirror is arranged in the vicinity of the laser source 10 between the laser source 10 and the collection optics 20. The spot size of the divergent radiation on the deflector 40 is considerably smaller than 50% of the beam diameter directly in front of the collection optics 20. The collection optics 20 can be a rotationally symmetrical spherical or aspherical lens. The overall length L is reduced compared to the representation in FIG. 1, while the overall width B has remained largely unchanged.

Figure 3:
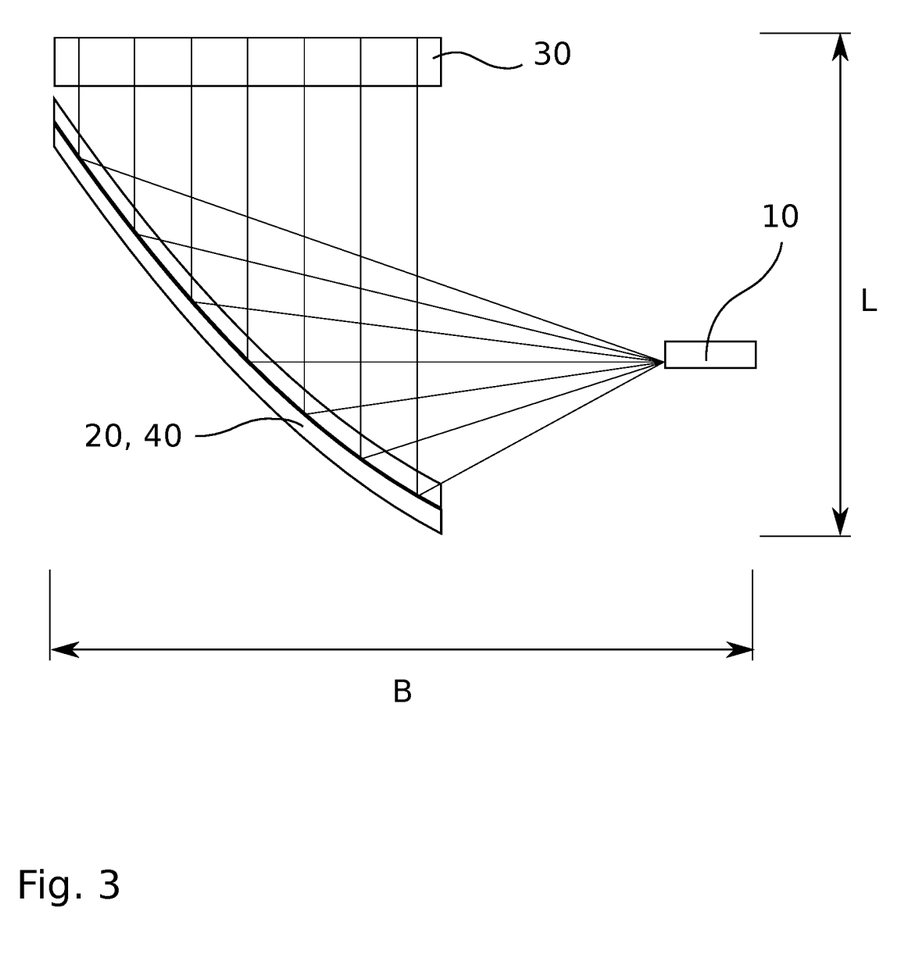
FIG. 3 is a schematic structure of a second embodiment of a projector module according to the invention ("collection mirror")

FIG. 3 shows a schematic structure of a second embodiment of a projector module according to the invention ("collection mirror"). The projector module comprises a beam path with a laser source 10, designed to emit coherent electromagnetic radiation with a divergent radiation profile; a collection optics 20, designed to collimate or focus convergently into an image plane the divergent radiation emitted by the laser source 10; and a diffractive optical element, DOE 30, designed to generate a projection pattern from the radiation collimated or converged by the collection optics 20; wherein a deflector 40 designed to deflect the divergent radiation emitted by the laser source 10 from a first direction into a second direction deviating from the first direction, is designed as a collection optics 20. The deflector 40 is an aspherically, preferably parabolically, curved mirror. The deflector 40 and the collection optics 20 are realized as a common component and so their functionality is combined. By saving an individual collection optics 20, the overall length L can be considerably reduced compared to the previously described embodiments. Depending on the application, however, an increase of the overall width B may have a negative effect.

Figure 4:
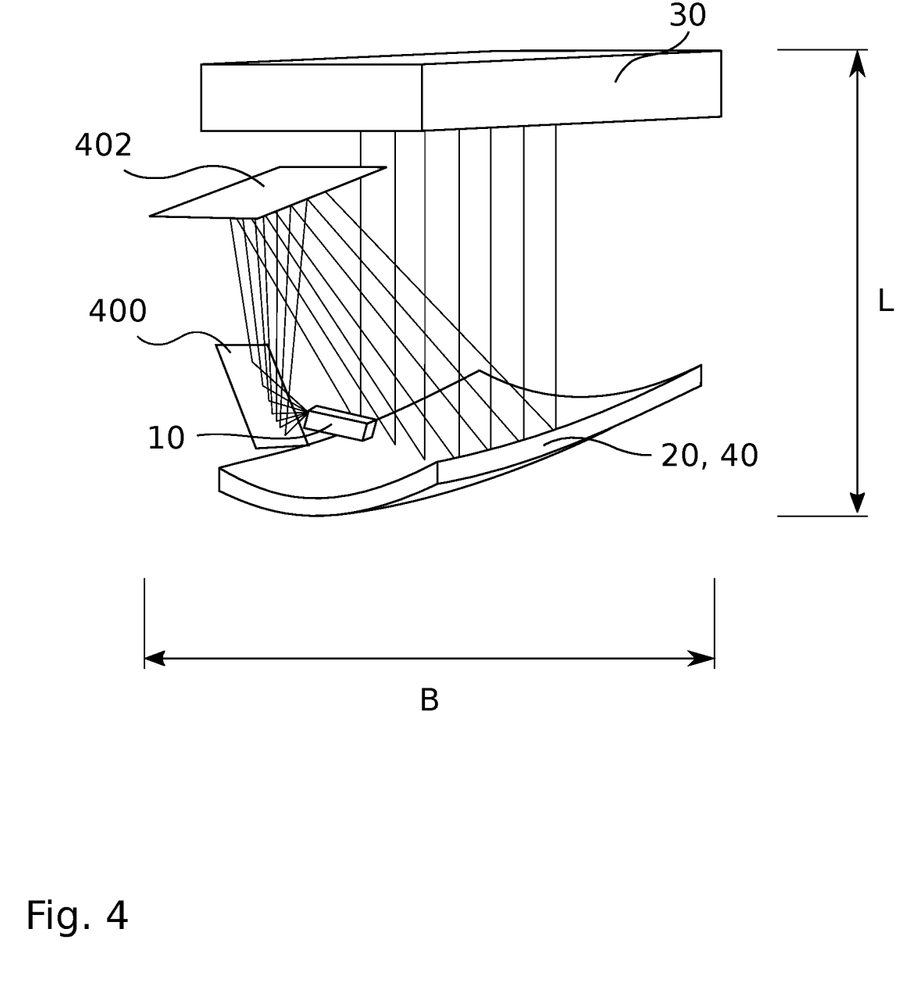
FIG. 4 is a schematic structure of a third embodiment of a projector module according to the invention ("multiple folding")

FIG. 4 shows a schematic structure of a third embodiment of a projector module according to the invention ("multiple folding"). In principle, this embodiment represents a fusion of the basic ideas of the first and second embodiment as described above. As in FIG. 3, this embodiment represents for the deflector 40 an aspherically, preferably parabolic, curved mirror for simultaneous deflection and collimation or focusing. However, in order to achieve in addition to a possible reduction of the overall length L also a reduction of the overall width B, the divergent radiation emitted by the laser source is deflected corresponding to the idea of FIG. 2 by two further deflectors (shown are a first and a second deflecting mirror 400, 402) before it hits the collection optics 20 (which in this exemplary embodiment coincides with another deflector 40). Due to this multiple folding of the beam path, a reduction of the installation space can be achieved both in the overall length L and in the overall width B.

Figure 5:
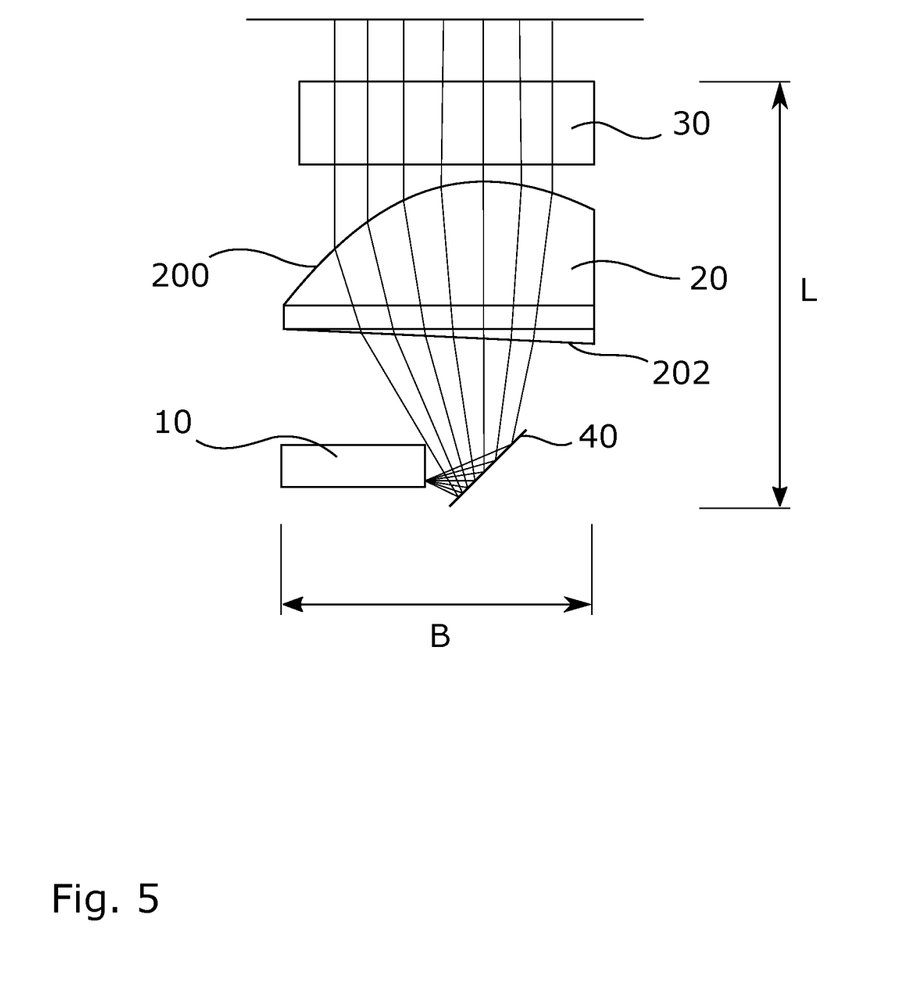
FIG. 5 is a schematic structure of a fourth embodiment of a projector module according to invention ("lens prism")

FIG. 5 shows a schematic structure of a fourth embodiment of a projector module according to the invention ("lens prism"). The representation largely corresponds to the representation in FIG. 2, the respective reference signs and their assignment therefore apply correspondingly. In addition, however, the collection optics 20 are a prism lens with a free-form surface 200 on the exit side and an opposite plane surface 202, wherein the plane surface 202 is inclined relative to the optical axis of the radiation collimated or converged by the collection optics (20). Hereby the prism lens shown represents a combination of a lens and a wedge-shaped optical element. In particular, as shown here, the free-form surface 200 can be shifted with respect to its alignment with respect to the optical axis of the radiation collimated (or converged) by the collection optics (20). With this combination, the beam path in the region of the divergent radiation is inclined in relation to the collimated or converged radiation and the laser source 10 can thus be positioned more centrally below the collection optics 20. With this embodiment, the overall length L and the overall width B of the module can also be significantly reduced.

Figure 6:
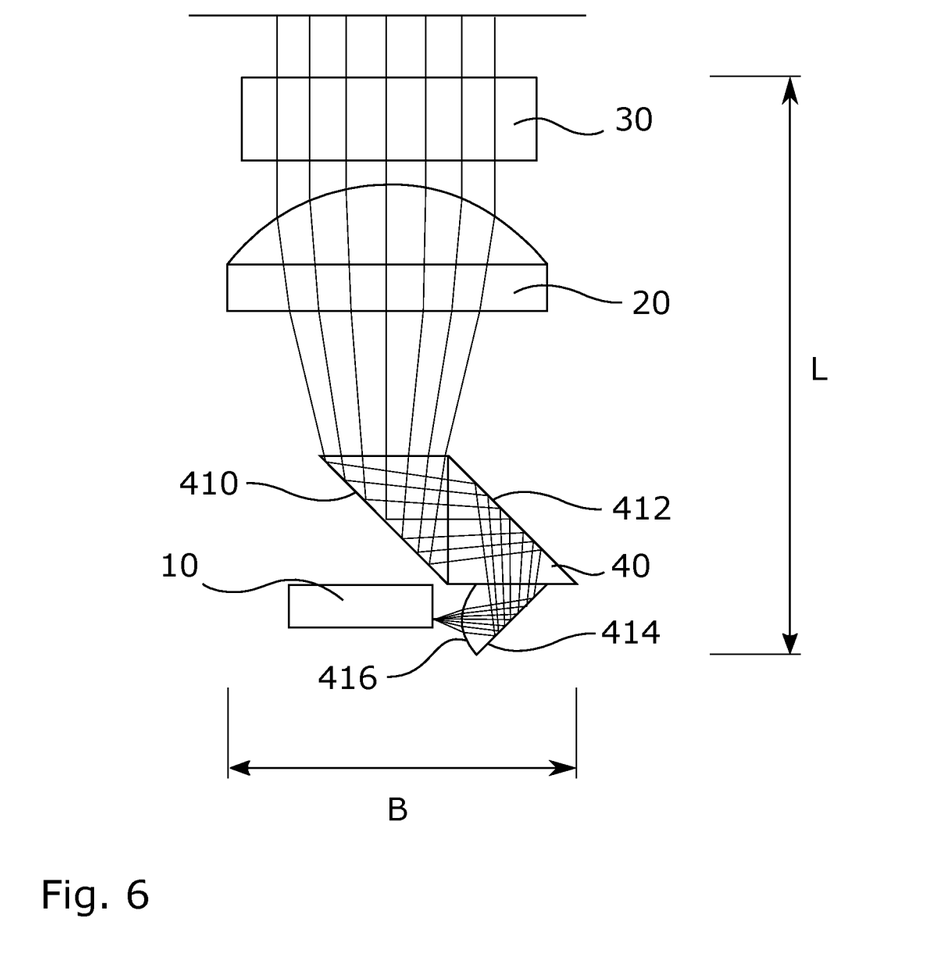
FIG. 6 is a schematic structure of a fifth embodiment of a projector module according to the invention ("prism folding")

FIG. 6 shows a schematic structure of a fifth embodiment of a projector module according to the invention ("prism folding"). This embodiment is also based on the representation in FIG. 2, the respective reference signs and their assignment therefore apply correspondingly. Here the beam path is folded a total of three times. In particular, the representation shows that the deflector 40 comprises three prism elements 410, 412, 414, wherein the prism elements 410, 412, 414 are arranged to form a prism body. The prism body continues to have a lens surface 416 on its entrance surface, which is designed to cause a reduction of the radiation divergence in the inside of the prism body. The effect of this arrangement corresponds to the effect of the third embodiment described above. The advantage of this configuration, however, is that the optical system is much less sensitive to tolerances and temperature changes.

Figure 7:
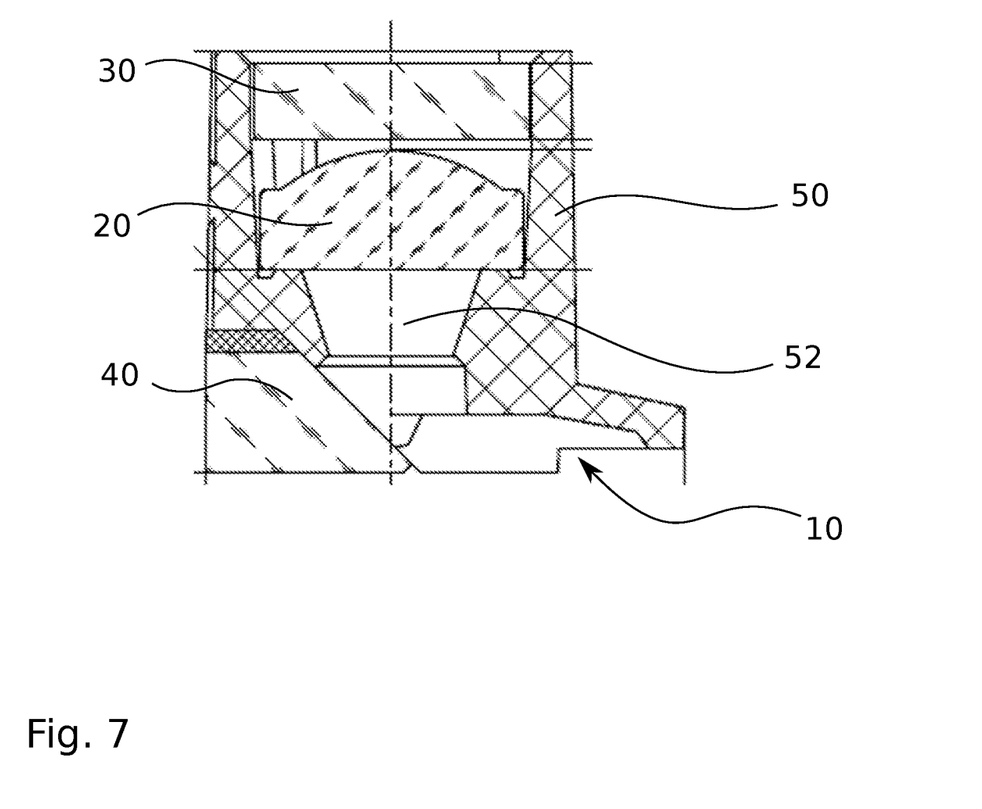
FIG. 7 is a schematic representation of a first embodiment of a projector module according to invention within a housing body.

FIG. 7 shows a schematic representation of a first embodiment of a projector module according to invention within a housing body 50. The representation largely corresponds to the representation in FIG. 2, the respective reference signs and their assignment therefore apply correspondingly. In addition, however, it is illustrated that the laser source 10, the collection optics 20, the DOE 30 and the deflector 40 are arranged in a common housing body 50, wherein the housing body 50 is a hollow body made of a body material, the inner region of which is designed for the conclusive reception of said components 10, 20, 30, 40 and in which non-radiation-guiding regions of the beam path are enclosed by the body material.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

REFERENCE LIST

10 Laser source
20 Collection optics
200 Free-form surface
202 Inclined plane surface
30 DOE
40 Deflector
400 First deflecting mirror
402 Second deflecting mirror
410 First prism element
412 Second prism element
414 Third prism element
416 Lens surface
50 Housing body
52 Beam guidance
L Overall length
B Overall width

What is claimed is:

1. A projector module comprising a beam path with:
a laser source configured to emit coherent electromagnetic radiation with a divergent beam profile;
a collection optics configured to collimate or focus the divergent radiation emitted by the laser source convergently into an image plane; and
a diffractive optical element (DOE) configured to generate a projection pattern from the radiation collimated or focused by the collection optics,
wherein a deflector configured to deflect the divergent radiation emitted by the laser source from a first direction into a second direction deviating from the first direction, the deflector is an aspherically curved mirror designed as the collection optic, and
wherein at least two deflectors deflect the divergent radiation emitted by the laser source before it hits the collection optics.

2. The projector module according to claim 1, wherein the laser source, the collection optics, the DOE, and the deflector are arranged in a common housing body and
wherein the housing body is a hollow body made of a body material, the inner region of which is designed for the conclusive reception of said components and in which non-radiation-guiding regions of the beam path are enclosed by the body material.

3. The projector module according to claim 2, wherein the common housing body is formed of a plastic material.

4. The projector module according to claim 1, wherein the laser source has an elliptical divergence profile and wherein the deflector is arranged in such a way that a deflection takes place around the fast axis of the divergence profile.

5. The projector module according to claim 1, wherein at least one deflector is a planar mirror, and wherein the mirror is arranged between laser source and collection optics.

6. The projector module according to claim 1, wherein the collection optics comprises a Fresnel lens.

7. The projector module according to claim 1, wherein at least one of the collection optics, the DOE, or the deflector comprise a glass material.

8. A mobile device comprising a projector module of claim 1.

9. Use of a projector module of claim 1 for generating a projection pattern for three-dimensional environmental or pattern recognition in mobile devices.

10. A projector module comprising a beam path with:
a laser source configured to emit coherent electromagnetic radiation with a divergent beam profile;
a collection optics configured to collimate or focus the divergent radiation emitted by the laser source convergently into an image plane, wherein the collection optics is a prism lens with a free-form surface on an exit side and an opposing planar surface, wherein the planar surface is inclined with respect to the optical axis of the radiation collimated or focused by the collection optics;
a diffractive optical element (DOE) configured to generate a projection pattern from the radiation collimated or focused by the collection optics; and
a deflector configured to deflect the divergent radiation emitted by the laser source from a first direction into a second direction deviating from the first direction, the deflector arranged in front of the collection optics.

11. The projector module of claim 10, wherein the laser source, the collection optics, the DOE, and the deflector are arranged in a common housing body, wherein the housing body is a hollow body made of a body material, the inner region of which is designed for the conclusive reception of said components and in which non-radiation-guiding regions of the beam path are enclosed by the body material.

12. The projector module of claim 11, wherein the common housing body is formed of a plastic material.

13. The projector module of claim 10, wherein the laser source has an elliptical divergence profile, wherein the deflector is arranged in such a way that a deflection takes place around the fast axis of the divergence profile.

14. The projector module of claim 10, wherein at least one deflector is a planar mirror, wherein the mirror is arranged between laser source and collection optics.

15. The projector module of claim 10, wherein the collection optics comprises a Fresnel lens.

16. The projector module of claim 10, wherein at least one of the collection optics, the DOE, or the deflector comprise a glass material.

17. A mobile device comprising a projector module of claim 10.

18. Use of a projector module of claim 10 for generating a projection pattern for three-dimensional environmental or pattern recognition in mobile devices.

* * * * *